(12) United States Patent
Haldner et al.

(10) Patent No.: US 7,128,793 B2
(45) Date of Patent: Oct. 31, 2006

(54) METHOD AND DEVICE FOR CUTTING A LAMINATE

(75) Inventors: René Haldner, Gossau (CH); Hans Fitzi, Herisau (CH)

(73) Assignee: Steinemann Technology AG, St. Gallen (CH)

( * ) Notice: Subject to any disclaimer, the term of this patent is extended or adjusted under 35 U.S.C. 154(b) by 0 days.

(21) Appl. No.: 10/276,375

(22) PCT Filed: May 18, 2001

(86) PCT No.: PCT/CH01/00310

§ 371 (c)(1),
(2), (4) Date: Jun. 16, 2003

(87) PCT Pub. No.: WO01/87599

PCT Pub. Date: Nov. 22, 2001

(65) Prior Publication Data

US 2004/0221947 A1    Nov. 11, 2004

(30) Foreign Application Priority Data

May 18, 2000    (CH) .................................... 0994/00

(51) Int. Cl.
*B32B 31/18*    (2006.01)
(52) U.S. Cl. .................... 156/64; 156/269; 156/355; 156/353; 156/522
(58) Field of Classification Search .............. 156/64, 156/353, 354, 355, 351, 259, 270, 522, 552
See application file for complete search history.

(56) References Cited

U.S. PATENT DOCUMENTS

| | | | | |
|---|---|---|---|---|
| 4,025,380 A | * | 5/1977 | Bernardo ................... 156/355 |
| 4,526,634 A | * | 7/1985 | Beer .......................... 156/64 |
| 5,518,569 A | * | 5/1996 | Achilles et al. ............. 156/250 |
| 5,639,335 A | | 6/1997 | Achilles et al. |
| 6,007,660 A | * | 12/1999 | Forkert ....................... 156/256 |
| 6,024,830 A | * | 2/2000 | Nedblake et al. ........... 156/353 |
| 6,224,699 B1 | * | 5/2001 | Bett et al. ................... 156/64 |
| 6,281,679 B1 | * | 8/2001 | King et al. ................. 324/229 |

FOREIGN PATENT DOCUMENTS

| | | |
|---|---|---|
| DE | 44 12 091 A | 10/1995 |
| EP | 0 706 863 A2 | 4/1996 |
| EP | 0 586 642 B1 | 6/1996 |
| EP | 1 282 510 B1 | 9/2004 |
| GB | 2 228 255 A | 8/1990 |

OTHER PUBLICATIONS

International Search Report in PCT Application No. PCT/CH01/00310 mailed on Aug. 28, 2001.

* cited by examiner

*Primary Examiner*—George Koch
(74) *Attorney, Agent, or Firm*—Finnegan, Henderson, Farabow, Garrett & Dunner LLP (57) ABSTRACT

The invention relates to a method for laminating and cutting a laminate (8) comprising a sheet having the shape of a web (1) and separate sheets (2). Said laminate (8) is fed towards a cutting station (9) and a computer controls cutting process as a function of the feed rate and a signal from the rear edge (28) detector. The cutting function of the blade is also controlled by computer as a function of the feed rate. The present invention also provides enhanced cutting precision and enables the combined use of a rear edge detector (28) and a front edge detector (17).

23 Claims, 4 Drawing Sheets

METHOD AND DEVICE FOR CUTTING A LAMINATE

TECHNICAL FIELD

The invention relates to a method for laminating and cutting a laminate, comprised of a plastic sheet in the shape of a web and separate sheets, whereby the laminate is fed towards a cutting station and the computer controls the cutting process as a function of the feed rate.

The invention furthermore relates to a device for separating a laminate, comprised of a sheet in the shape of a web and separate sheets, whereby the laminate is fed towards a cutting station and the computer controls the cutting function of the cutting blade as a function of the feed rate.

STATE OF THE ART

The relatively thin sheet of plastic material is removed continuously from a roll. In the case of separate sheets, the sheets are removed from a stack. Both are fed together as laminates to the laminating machine. To prevent any soiling of the rollers in the laminating machine, the individual successive sheets are frequently overlapped in the peripheral area. They are over- or underlapped and covered with the plastic sheet. However, it is also conceivable to laminate the separate sheets butt-joint to butt-joint. After the laminating, the separate sheets are connected by the plastic sheet. Prior to further processing in a downstream work process, the laminate has to be separated again into individual laminate sheets or the laminate has to be cut at the butt joint of two sheets.

CONFIRMATION COPY

EP 706 863 proposes a new cutting method as well as a new device for separating laminated laminates, comprised of separate sheets and a plastic sheet. For the preparation of laminate segments, the laminate is often fed continuously toward a cutting station. The heat effect of a thermal cutting blade separates the plastic sheet in the area of the butt joints of the sheets. For each cut, the cutting blade is accelerated to the same rate as the laminate. Only the plastic sheet is cut. The movement of the cutting blade is effected by a circulation variable speed drive. The processing speed of the equipment as well as the length of the sheet can be inputted by computer and a precise cut can be made. A sensor and/or an optical barrier monitors the front edge of the respective arriving sheet so that the cut is made accurately within a narrow tolerance range based on the feed rate and the length of the sheet. The aforementioned method was developed in view of wet cutting. With dry cutting, such as thermal lamination, an even greater precision is desired for the separation cut.

Practice has frequently shown that depending on specific laminate qualities, the bonding agent is partially the laminate and increasingly the cutting station, i.e., the flange neck. An increase was made impossible by either the one or the other step. Experience has shown that higher rates lead to a higher number of imperfect sheets. If the problem is detected, the unusable sheets have to be removed immediately from the processing line. The speed of the facility can be lowered for this purpose, or the facility can be shut off. Each restart constituted a small problem because the cutting cadence could no longer be reconstructed by the computer at momentarily varying speeds. During the time period where the rate of the sheet feed is subjected to a change, the acceleration of the rotating cutting blade would have to be determined and appropriately controlled with a high-speed computer. Not even the fastest computers would be able to accomplish this task. There were attempts at so-called manual starts, where the operating personnel manually dictated the speed for the first step(s). However, the difficulty of this approach increases commensurate with the increase in operating speed. A solution in accordance with EP 706 863 controls the entire cutting process at a very high level. In the sense of a production increase, it is also necessary to safely increase the cutting cadence at even higher striking precision for the cut.

REPRESENTATION OF THE INVENTION

The invention was therefore based on the problem to find solutions that permit a precise cutting intervention, even at highest transport rates of 50 to 100 meters per minute and higher.

The method in accordance with the invention is characterized in that the separate sheets are fed to the lamination butt-joint to butt-joint or overlapping and even prior to lamination, the cutting lines are continuously detected precisely by an edge sensor especially at the rear edge, and the signal is used as the basis for the calculation of the onset of the separating action.

The device in accordance with the invention is characterized in that preferably in the area before the lamination, a sensor is arranged for continuously detecting especially the respective rear edge of the sheets, and the cutting function for the plastic sheets can be executed on the basis of the precisely detected edge signals.

Previous technology concentrated on sensor techniques for the precise recording of the respective advancing edge of a sheet. This was a must because of the use of optical sensors. The light ray cannot penetrate an overlap. The front edge is free immediately after the cut if the preceding sheet is pulled off slightly faster after the cut. Based on the knowledge of the precise length of the sheet, it was possible to set the cutting function with certainty until the arrival. The new solution demands sensor means for recognizing the rear edge of each sheet. This has unexpected advantages: The computing effort for the cutting process is reduced to taking into account the precise sensor signal and the transport rate because the cutting location itself is recorded prior to the cutting action. An acceleration due to stoppage or a change in the rate of the sheet feed is no longer an insurmountable risk. By assuming the respective rate or the course of the rate, the cutting process can be controlled within a range of one millimeter or less. The method is preferably used with underlapping sheets, which is largely the case in the practice of laminating by means of laminates. In the exceptional case that the sheets are delivered butt-joint to butt-joint, the known sensor means can no longer record the rear edge, which corresponds to the front edge of the subsequent sheet, with sufficient dependability. This is where the edge can be artificially rendered visible by means of a "slight upward bulging" of the sheets that are passing through, for example in the center area where the sensor beam appears, and the upper edge, which is now projecting, can be detected with certainty.

Preferably, the detection of the edge is performed approximately in the center of the rear edge. The best results so far have been achieved with laser monitoring technology by means of appropriate transmitting- and receiving signals for the detection of the edges. However, it is also possible to use infrared rays or microwave sensors. With underlapping, it is also possible to use the blowing pressure of an air nozzle for continuous detection of the rear edge. At least theoretically, it is possible to ensure the detection in the same way with overlapping. However, overlapping is not used as frequently in practice and has the slight disadvantage that the top edge will advance, so to speak. The edge advances towards the signal transmitter, meaning that the signal transmitter has to be used in backward direction. With underlapping, the beam is directed against the machine and does not interfere with the environment.

In accordance with an especially advantageous embodiment of the device, a pair of laminating rollers is arranged in front of a cutting station, the sensor for the continuous detection of the rear edge of the sheet is arranged even before the pair of laminating rollers, and the rear edge of the unlaminated sheet is recorded. According to current knowledge, this is presently the most optimal solution. The edges of the unlaminated sheets are recognizable with razor-sharp clarity especially with underlapping, and the timing and location of the edge can be detected with corresponding precision even in a range of tenths of millimeters, so that the separating cut can be made efficiently with millimeter-precision. The unprocessed sheets are stored essentially horizontally at the one end side of a feed guide and are guided preferably with underlapping through the processing line in the direction of the other end side of the feed guide. The cutting station has a cutting blade that can be moved along at the rate of the laminate during the cutting action, as well as a variable circulation speed drive for the cutting blade. The thermal cutting blade is designed for the wet separation of the plastic sheet. The circulation speed of the cutting blade can be controlled as a function of the computer based on the feed rate and the sensor signal to accelerate the cutting blade to the rate of the laminate for a precise cutting of the plastic sheet. Because the cut in accordance with the new solution is very accurate, the cutting blade can also be used for dry laminates.

Because a lesser computer performance is required compared to that of the solution in EP 706 863 or EP 586 642, the new solution allows an adaptation of the movement rate of the blade, even at a momentarily varying circulation speed of the sheets. This means that in the case of a start or restart, only the first sheet may have to be removed from the feed guide as waste if it had been held too long in the pair of laminating rollers. In specific applications, it is furthermore conceivable to arrange the sensor between the pair of laminating rollers and the cutting station if as the edge can be detected through the plastic sheet with sufficient precision.

If the sensor is designed as an infrared-, microwave- or laser beam transmitter and -receiver, the sensor beam is aligned in the direction of transport, preferably with a slight tilt. Preferably, the receiving signal is received approximately vertically by the sensor, at least in the case of laser beam technology.

In accordance with another embodiment, the cutting blade can be designed as a laser cutting blade, preferably with a multiple of fixed laser cutting heads, whereby the cutting action can be time-controlled analogously based on the rate of the feed guide as well as the sensor signal. Laser cutting technology has the great advantage that no movable parts are necessary for the separation if the laser beam itself is controlled electronically and works on an allocated segment. According to this example, a multiple of laser cutting heads are required on one line across the width of the machine.

BRIEF DESCRIPTION OF THE INVENTION

The invention is now explained in greater detail by means of some examples. Shown are.

WAYS AND EXECUTION OF THE INVENTION

In the following, reference is made to FIG. 1: The cutting station 9 has a thermal cutting blade 10 on the plastic sheet side. Said cutting blade is fastened to a cutting bar and runs over the entire width of the laminate. The cutting bar rotates in the direction of arrow d', i.e., in the same direction of rotation as the feed direction c of the laminate 8. The cutting blade 10 is preferably comprised of an electrical wire or a thin metal strip that can be heated by electrical resistance. After the cutting station 9, a light barrier or a measuring transmitter 17 is arranged in the feed area of the laminate 8. With the help of said light barrier or measuring transmitter, it is possible to determine the front edge of a laminate segment. A slightly increased speed at the transport device 11 ensures that the separated laminate segments 16 are pulled off immediately, thus creating a gap between the single laminate segments 16. The path traveled by the laminate segments 16 is determined, for example, by an incremental transmitter 18 at the pair of laminating rollers 7. The respective next cutting process is controlled as a function of the values determined by the transmitters 17 and 18 and depending on the sheet lengths previously inputted into the control arrangement.

Figure 1:
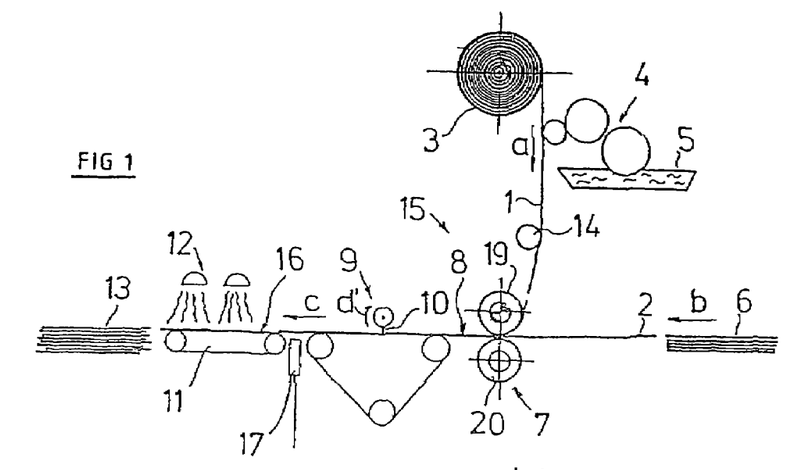
FIG. 1 a basic diagram for the laminating and cutting of sheets in accordance with the state of the art.

FIG. 1 is a schematic representation of the laminating process of single sheets with a plastic sheet 1 in a laminating device 15. The plastic sheet 1 is pulled as a continuous web from a raw plastic sheet roll 3 in the direction of arrow a and coated on one side with liquid adhesive in the process. The adhesive 5 is applied and distributed by an application device 4. The plastic sheet 1 coated with adhesive is then fed to the laminating rollers 7. The single sheets 2 are removed from a stack of sheets 6 and also fed successively into the roller gap of the laminating rollers in the direction of arrow b with the help of a sheet guide. The resulting laminate 8 is again separated into laminate sheets by the cutting blade 10 of the cutting station 9, whereby only the plastic sheet 1 is cut. The laminate segments 16 then travel in the direction of arrow c to a transport arrangement 11 and pass through a hardening station 12, where the adhesive is hardened with UV rays. Then the laminate segments 16 are deposited on a laminate stack 13. The laminating rollers 7 are comprised of an upper plastic sheet roller or mother roller 19 as well as a lower sheet roller or counter-pressure roller 20.

Figure 2A:
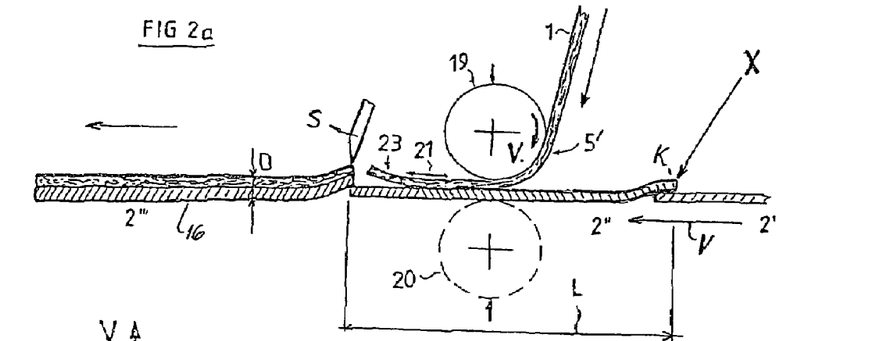
FIG. 2a the core approach of the new solution with a sensor for edge detection of the rear edge of the sheet FIG. 2b an example for the course of the rate of the cutting blade with constant feed rate of the sheets.

FIG. 2a shows a single laminate segment 16 by accentuating the thickness D as well as a length L. The sheet 2''' can be a sheet of paper or cardboard. The plastic sheet 1' is principally comprised of a transparent plastic. Both are connected by a layer of adhesive 5'. In the case of adhesives that are hardened by rays, the plastic sheet 1' can be displaced relatively easy relative to sheet 2''' according to arrow 21 as long as the adhesive has not yet hardened, which, however, is not desirable for a number of reasons. For example, it is disadvantageous for further processing if an edge of the plastic sheet projects relative to the sheet 2'''. The goal is to connect the plastic sheet for the lamination as tension-free and thus also as stress-free to the laminate as possible. Many experiments have shown that the projecting tear edge 23 (FIG. 2a) created during wet cutting immediately lays down and the adhesive connection at the respective location is almost equal to the remaining connection after the adhesive has hardened. FIG. 2a furthermore shows the actual lamination, here again accentuated for better understanding, with the pair of laminating rollers 7 and/or the plastic sheet roller 19 and the sheet roller and/or counter-pressure roller 20 shown in dashed lines. The letter X indicates the detection of the edge K by a beam sensor. This means that, unlike the solution in accordance with EP 0 706 863, it is no longer the front face side that is detected (usually through light sensors), but the top edge K of the rear sheet end, and the rate VB of the sheet 2'' and/or the course of the rate is recorded. When employing the new solution, the length L of the single sheet is no longer relevant for computing the separating action in accordance with the new solution. Deviations from the length measurements of the single sheets no longer have a disturbance function on the cutting precision within a range of tolerance values. The use of the cutting blade can be adjusted with even greater precision to the course of speed of the sheet, so that the cutter action is precise even at a variable speed start, for example.

Figure 2B:
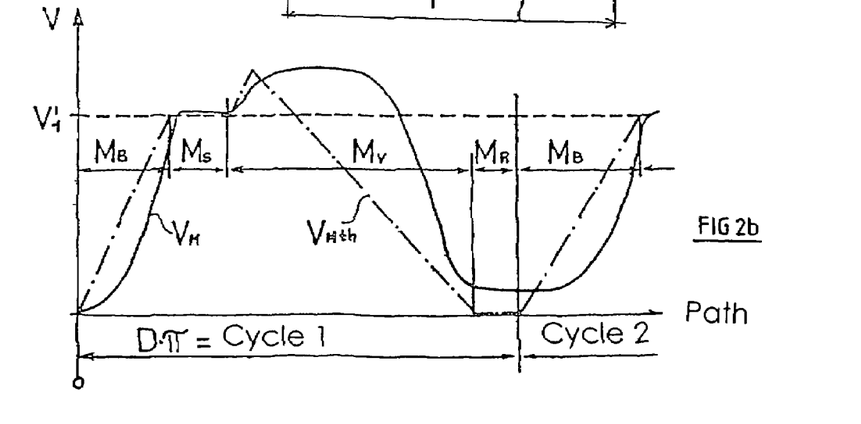

FIG. 2b is an example of a diagram for the course of the cutter speed at constant sheet rate over a rotation or over an entire cycle 1. In the diagram, MB means cutter acceleration, Ms means cutting contact, Mv means cutter time delay and MR means cutter idle state. The diagram, which shows the speed over the course, shows very clearly how the cutter is accelerated significantly prior to the cut (Vm) up to the speed V1. The cutter then has to be moved quickly along with the laminate and enters a time lag phase VMth. It is important here as well that the course of the speed is not only controlled during one rotation, especially for the cut, but that the process is controlled by an incremental transmitter JG, especially preferably the same as for the control of the sheet feeder, so that the cutting sequence corresponds precisely to the length of the sheet being processed. Preferably the drive is controlled with base programs for the course of movement, which are adjusted as a function of the computer to the respective specific sheet feed rates and any changes in the rates.

Figure 3:
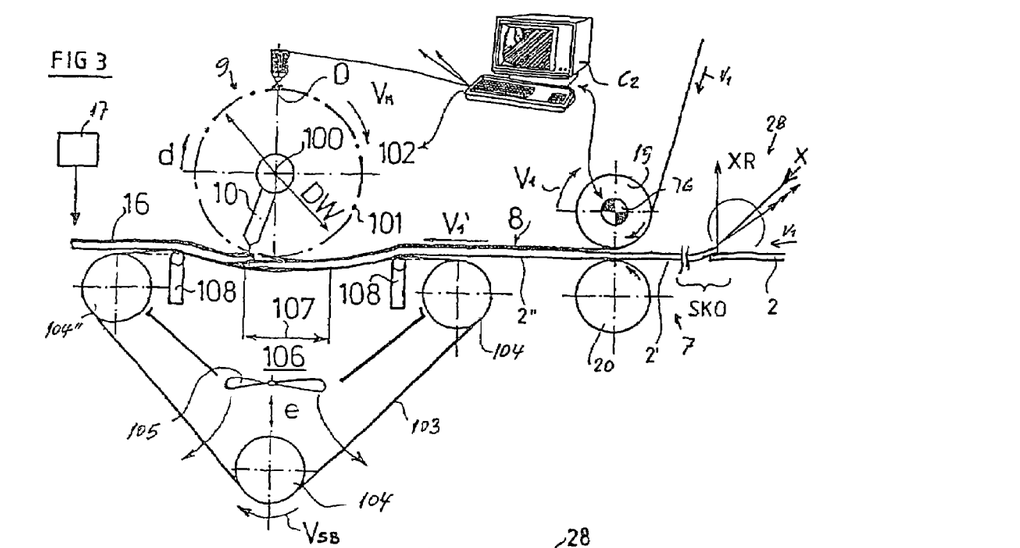
FIG. 3 a diagram of the new solution.

Reference is then made to FIG. 3, which shows the lamination of the laminate as well as producing the laminate segments for a wet cutting of the plastic sheet. The cutting blade 10 executes a rotation movement relative to an axis of rotation 100, whereby the circle of action of the cutting blade, which can be a generally known thermal cutting blade, is shown in dash-dots by a circle 101. The normal direction of rotation is stated as d, and DW means the diameter of the circle of action 101. The drive 102 is not shown, but it can be an generally known design. The drive 102 must be designed for a very precise and extremely quickly changing rotational speed of the cutting blade, and it must be correspondingly controllable by a computer $C_2$. The laminate moves from the laminating rollers 7 horizontally on a suction feeder 103 running along at the same rate V1, which is stressed over three turn-around rollers 104, 104' and 104'' with sufficient preload e. A fan wheel 105 symbolizes the function of a negative pressure for a small chamber 106. In that way, the laminate is not only moved along by the support belt 103, but it is simultaneously also guided through the cutting station 9 with a corresponding suction power of the suction belt 103. Outside of an area 107, where the cutting action of the cutting blade 10 takes place, two support locations 108 and/or 108' are arranged below the support belt 103. The effective cutting track and/or circle line 101 is slightly lower relative to the undisturbed movement path of the laminate so that the cutting blade 10 presses the laminate downward correspondingly, whereby not only the heat effect but simultaneously also a slight mechanical cutting force is in effect.

The reference symbol 17 describes a light barrier corresponding to the solution according to EP 706 863. In many cases, the additional control of the front face side has other advantages, such as the automatic monitoring of the entire cutting function as well as the lamination and, for example, the counting the sheets as well. Once the sheet has passed the control path SKOI for the rear edge, the sensor arrangement 28 no longer "knows" anything. However, at a start or restart, the presence of the sheet 2'' is detected by the light barrier 17 and a corresponding interference signal is transmitted. The separating function is controlled by the sensor arrangement 28, whereas other monitoring functions are ensured by the light barrier 17.

Figure 4A:
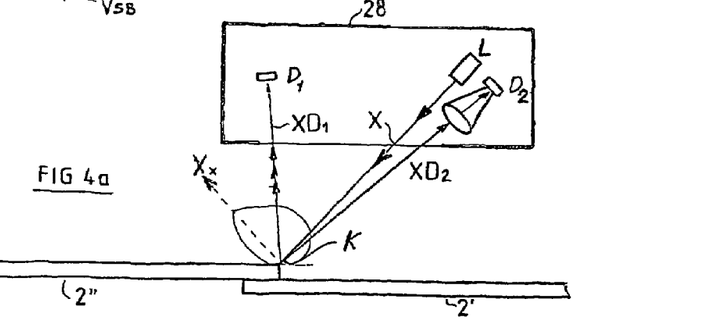
FIG. 4a the sensor device with beams, primarily laser beams.

FIG. 4a shows a laser sensor based on optical edge detection. The edges of the sheets are detected easiest if they are transported overlapping, preferably underlapped, under the laser beam on conveyer belts. A laser diode with focusing optics (L) of the sensor arrangement 28 generates a tiny red light point on the conveyer plane, which is well visible. In that way, the laser beam (X) hits the surface at a slant. According to light scattering theory, the largest part of the light is reflected in the direction (Xx). The detector D1 then receives more light (XD1) than the detector D2 (XD2). If the laser beam hits an edge, exactly the opposite is the case and D2 receives more light than D1. Because of its well-focused laser beam, the compact device detects even very small edges. An integrated micro controller suppresses undesired multiple pulses by switching the device inactive during a time lag after each detected upper edge. Various programs guarantee an optimum adjustment to all counting problems:

Fixed time lag: can be set in milliseconds.

Dynamic time lag: The micro controller continuously monitors the pulse sequence and eliminates multiple pulses even at varying transport speeds by adjusting the time lag dynamically to the pulse sequence.

Synchronization with the machine cycle: The machine cycle (for example from a rotary pulse generator) can be synchronized through a synchronization entry. Thus, the dead zone corresponds to a defined distance that is completely independent of the transport rate.

Figure 4B:
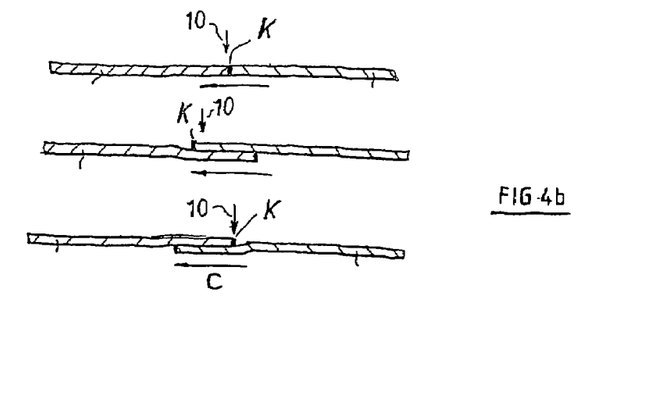
FIG. 4b the three possibilities of the sheet feed, butt-joint to butt-joint, overlapping and underlapping.

The top of FIG. 4b shows a laminate 8 butt-joint to butt-joint in the center, overlapping and underlapping at the bottom, with a respective optimum cutting effect of the cutting blade 10 for the separation of the laminate.

Figure 5:
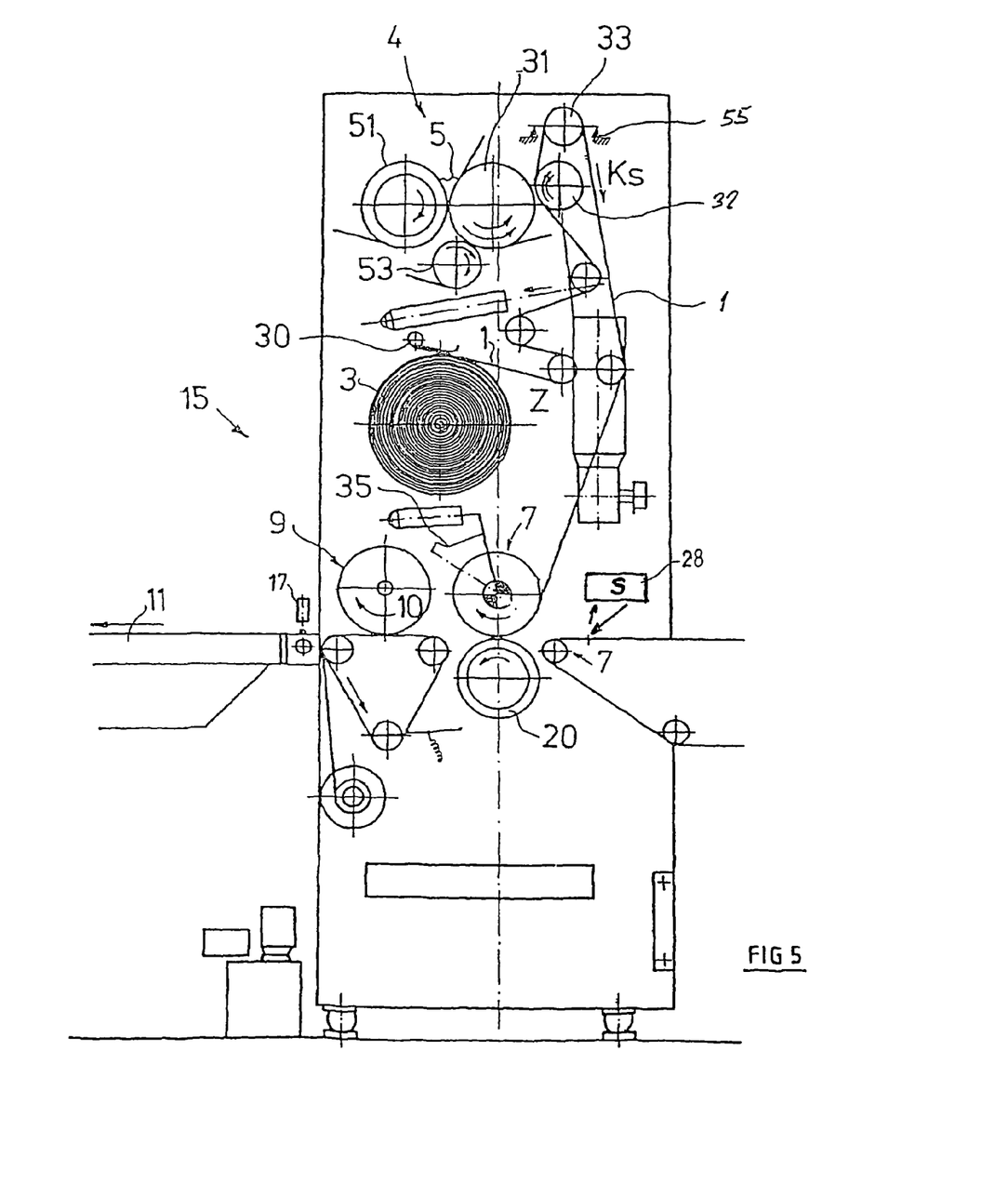
FIG. 5 the most important components for the laminating and separating with the application device.

The laminating device 15 is shown more specifically in FIG. 5. The raw plastic sheet 1 is pulled off a driveless raw plastic sheet roll 3, if necessary with a controlled, slight retention force and brake arrangement 30. This leads to a varying tensile force "Z", which is generated by an application roller 31 as well as a press roller 32 which can be pressed to said application roller. The application roller 31 is controlled by the incremental transmitter 18 of the plastic sheet roller 19. To be able to set the plastic sheet 1 coated with the adhesive to a minimal tension force Ks, the plastic sheet comprises a measuring roller 33, which overrides the speed of the application roller 31 or adjusts it to the desired peripheral speed based on a tension measuring value. A sheet feeding table 34 is also controlled to the effective peripheral speed of the plastic sheet roller 19 so that the sheet and the plastic sheet are fed into the pair of laminating rollers 7 at the same rate. The plastic sheet 1 has only sufficient tension that it is tensioned tightly, but not pulled. The laminating rollers 7 have a generally known bearing 35 to increase the axial distance quickly with correspondingly smaller forces for the thicker overlapping part.

Figure 6:
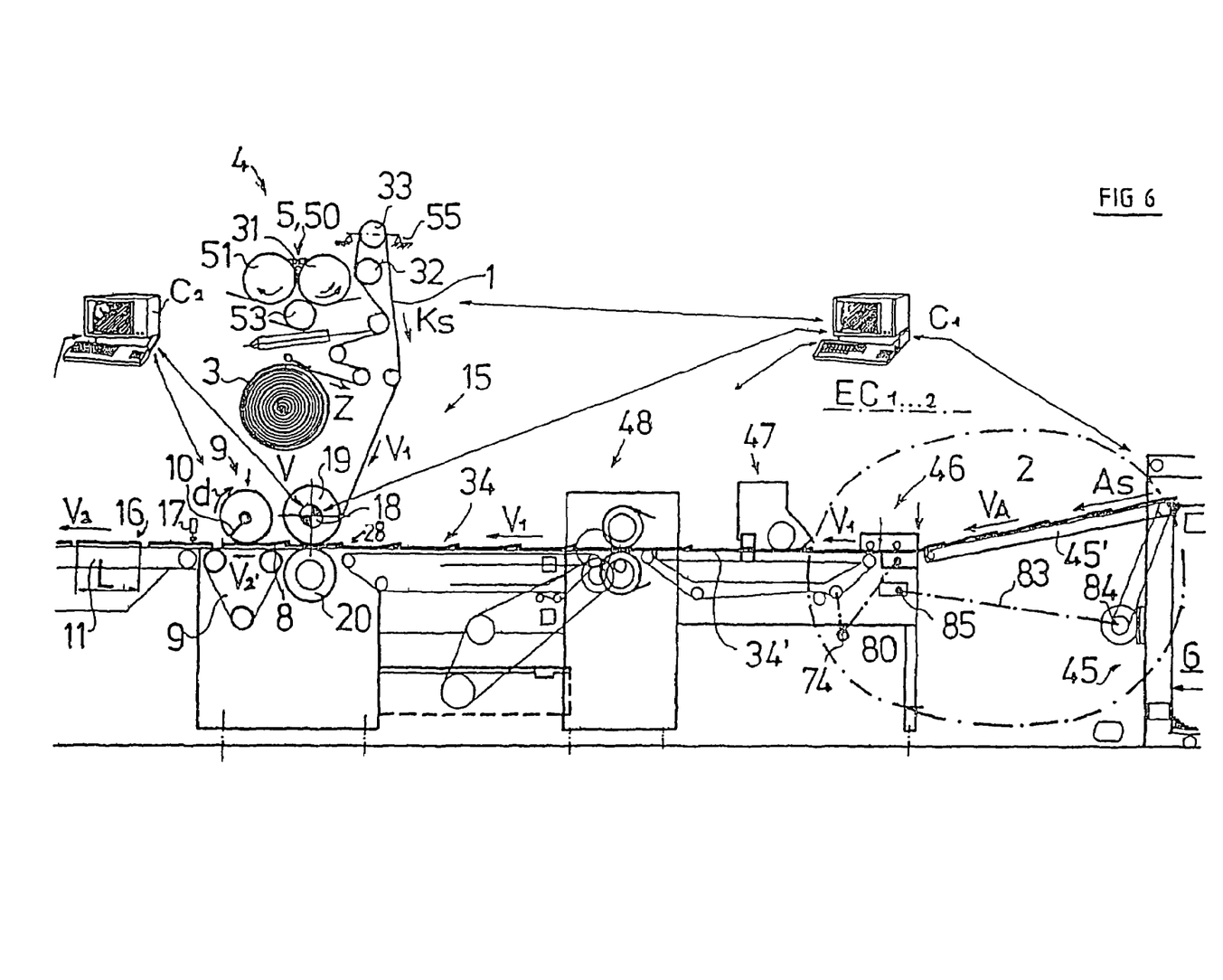
FIG. 6 an example of an entire feed guide.

Reference is then made to FIG. 6, which shows a schematic diagram of the process of laminating single sheets with a plastic sheet 1 in a laminating device 15. The plastic sheet 1 is pulled off a raw plastic sheet roll 3 as a continuous web and coated on one side with liquid adhesive during said process. The UV-polymerizable adhesive is applied and distributed by an application device 4. The plastic sheet 1 coated with adhesive is then fed to the laminating rollers 7. The single sheets 2 are removed from a stack of sheets 6 and also inserted into the roller gap of the laminating rollers 7 with the help of a sheet guide 45 in the direction of the arrow (VA, V1). The continuous laminate 8 formed in the laminating rollers is cut into laminate segments 16 with the cutting blade 10 of the cutting station 9, whereby only the plastic sheet 1 is cut. The laminate segments 16 then reach a transport arrangement 11, where they pass a hardening station 12 and the adhesive is hardened with UV rays. Then the laminate segments 16 are deposited on a laminate stack 13 (FIG. 6). The laminating rollers 7 are comprised of an upper plastic sheet roller or mother roller 19 as well as a lower sheet roller or counter-pressure roller 20.

On the plastic sheet side, the cutting station 9 has a thermal cutting blade 10, which is fastened at a cutting bar and runs across the entire width of the laminate 8. The cutting bar rotates in the direction of arrow d, i.e. in the same direction as the laminate 8 is advancing. The cutting blade describes a revolution. The cutting blade 10 is preferably comprised of an electrical wire or a thin metal strip that can be heated by electrical resistance. After the cutting station 9, a light barrier or another suitable measuring transmitter 17 is arranged in the feed area of the laminate 8. With the help of said light barrier or measuring transmitter, it is possible to determine the front edge of a laminate segment. A slightly increased speed at the transport device 11 ensures that the separated laminate segments 16 are pulled off immediately, thus creating a gap between the separated laminate segments 16. The rate of the laminate 8 is determined, for example, by an incremental transmitter 18 at the pair of laminating rollers 7. The respective next cutting process is controlled as a function of the values determined by the transmitters 17 and 18 and depending on the sheet lengths previously inputted into the control arrangement. It is a goal of the invention that the plastic sheet for the lamination is without tension and without stress, and thus also connected to the laminate without stress. Many experiments have shown that a projecting tear edge created during wet cutting lays down immediately and the adhesive connection at the respective location is equal to the remaining connection after hardening.

It goes without saying that the feed guide can also be designed for other adhesive connections. Adhesives containing solvents, dispersion adhesives or even pre-coated plastic sheets can be used. Depending on the type of adhesive used, the hardening station 12 (FIG. 6) after the cutting station 9 may become obsolete, and a dryer could take its place in front of the laminating rollers 7. The cutting station 9 could also be arranged after the hardening station. However, the method in accordance with the invention also allows an execution of the wet separation of the plastic sheets directly after leaving the pair of laminating rollers. In certain cases, it is advantageous to spool the laminate 8 first on a roll and then divide the roll into single segments 16 at a later date during a separate work step.

The raw plastic sheet 1 is pulled off a raw plastic sheet roll 3 by a driveless braking arrangement that effects a slight retention force. This leads to a varying tensile force "Z", which is generated by an application roller 31 as well as a press roller 32 which can be pressed to said application roller. The incremental transmitter 18 of the plastic sheet roller 19 controls the application roller 31. To be able to adjust the plastic sheet 1 coated with the adhesive to a minimal tension force Ks, the film comprises a measuring roller 33, which overrides the speed of the application roller 31 and/or adjusts it to the desired peripheral speed based on a tension measuring value. A sheet-feeding belt 34 is also controlled to the effective peripheral speed of the plastic sheet roller 19 so that the sheet and the plastic sheet are fed into the pair of laminating rollers 7 at the same rate. The plastic sheet 1 has only sufficient tension that it is tensioned tightly, but not pulled. The laminating rollers 7 have a generally known bearing to increase the axial distance quickly with correspondingly smaller forces for the thicker overlapping part. The dosing roller 51 (arrow), which rotates significantly slower, runs according to the desired speed of plastic sheet 1 as well as the respective desired layer thickness of the adhesive application. Because the application roller 31 rotates faster (2 arrows) than the dosing roller 51, the adhesive film remains on the application roller 31. However, the thickness of the adhesive film is purposely chosen greater than the desired adhesive application thickness on plastic sheet 1. The excess adhesive can be removed either by an adjustable doctor blade or a distributor roller 53 whose speed can be set independently. With the adjustable doctor blade, this is done through the thickness of the gap, and with the distributor roll by varying the speed and/or the dosing clearance. Depending on the problem definition, cleaning doctor blades, for example also for the lateral delimitation of the adhesive application, can be used with all rollers. It is important, however, that the speed ratio of the application roller 31 relative to the dosing roller 51, as well as pressing pressure or the dosing gap between the application roller 31 and the distributor roller 53, can be set independently. Another important aspect for an optimal application of adhesive is furthermore that the pressing roller 32 has means, independently of the "adhesive rollers" (the application roller 31, the dosing roller 51 as well as the distribution roller 53) for independently pressing the pressing roller 32 to the application roller 31. The pressing roller 32 is preferably not driven by motor. In that way, each partial function can be optimized independently. The measuring roller 33 is preferably supported by path-free load sensing bearings 55. For this purpose, a control system is provided, which controls the rotational speed of the application roller 31 to a specific predetermined tension force Ks of, for example several hundred grams, by computer so that the plastic sheet can be fed to the lamination without tension. The remaining control commands, for example for an adhesive dosing- and application station, can also be given by the computer $C_2$.

FIG. 6 shows the coordination of the main functions from the view of control technology, especially that of the feed guide 45 and/or the sequence As, the output speed V1 and/or the laminating device 15 and the cutting station 9, which in the shown example is executed by two computers $C_1$ and $C_2$. One of the main functions of the computer $C_1$ is the precise determination of the sequence As as a feed performance of the feed guide 45. The corresponding control signal is JG $S_2$. The sequence As is a result of the function of processing speed (V1), the sheet length L, and the measure of underlapping. It is possible to use the computer $C_2$ as the main computer and arrange it, for example, in the area of the sheet depositor. Thus, $C_2$ is also the input station for the sheet guide. $C_1$ can be constructed at the same comfort level, as a second main computer or as a subordinate computer. What is essential is the coordination. However, it is also possible to use only one single computer.

Preferably, the computers are arranged with AC servo motors with performance electronics decentralized at the location at their respective computing use with a data bus which, depending on the requirements, transmits the data directly between the onsite computers. This relates especially to the sensor signal for the detection of the upper edge of the rear sheet edge as well as the signals of the incremental transmitters 18/19 of the laminating device for the computer $C_2$.

Practical tests have shown that the new solution can be used especially advantageously in combination with the older solution according to EP 706 863 or from case to case for the one or other solution. According to the previous solution, the course of the cutting blade rate, especially for the cut, is controlled corresponding to the feed rate and in conformance with the sheet length (L). The effective cutting track and/or circular line of he cutting blade is slightly lower compared to the undisturbed movement path of the laminate. During the cut, the laminate is pressed correspondingly into the path of movement. The cutting of the plastic sheet is performed by the effect of the heat as well as a very small mechanical cutting force. A support belt for the laminate is arranged below the cutting device, which is moved along with the laminate at approximately the same rate. The plastic sheet is cut wet from a laminate enforcement and the laminate segments are separated. For the cut, the cutting blade performs a rotating movement relative to a support belt that is moved along, and the rotational speed of the cutting blade is controlled by computer, whereby the measuring device is moved along with the laminate at approximately the same rate for each cut as a cutting cycle accelerated to the rate of the laminate, and is then slowed down to a slower speed. The processing speed and the sheet length can be readily inputted by computer, whereby the cutting blade is controlled based on the effective processing speed and depending on the length of the sheet. The respective current processing speed is determined by a main drive, and the remaining functions are coordinated accordingly.

For the preparation of UV-laminates, the laminating device combines the plastic sheet and separate sheets into a laminate and fixes it with UV-rays. Plastic sheet and sheet are brought to rate equal to the laminating device, the plastic sheet is rolled onto the sheets without thrust, swimming with little press force and as tension-free as possible, and the laminate is cut wet immediately prior to radiation fixation. The remaining steps of the method are:

a) the unprocessed sheets are positioned at the one end side of a sheet feeder and guided essentially horizontally through the processing line to the other end side of the sheet feeder.

b) The plastic sheet is separated wet, and the plastic sheet separation is performed by the heat effect of a thermal cutting blade.

c) The rotational speed of the cutting blade is controlled by computer and for each cut, the cutting device is accelerated to the speed of the laminate as a cutting cycle.

The method is especially suited for cutting a laminated laminate, comprised of a plastic sheet in the shape of a web and single sheets, whereby the laminate is guided continually at a cutting station and supported for the cutting of the plastic sheet, and a cutting blade is moved toward the laminate and away from the movement path of the laminate with a rotational movement and guided at about the same rate as the laminate for the cut, and only the plastic sheet is cut. An O-position sensor is arranged in an upper area of the movement of the cutting blade to define an O-point. The peripheral speed of the cutting blade can be controlled by computer such that the cutting device is accelerated to the rate of the laminate for each cut as a cutting cycle and moved along with the laminate during the cut at approximately the same rate, and then the speed is slowed down. The O-point or calibration point is arranged in the range of the lower speed and can be used as a starting point for computing the next cycle, whereby each cutting cycle corresponds to a full rotation of the cutting device and the O-position is selected locally in the upper movement quarter of the rotational circle. Support locations are arranged below the support belt in such a way that the effective cutting path or circle is slightly lower relative to the undisturbed movement path of the laminate, so that the cutting blade correspondingly presses the laminate downward, with not only the heat effect but simultaneously also a slight mechanical cutting effect. The cutting blade has an electrical wire or a thin metal strip that can be heated by electrical resistance.

What is claimed is:

1. A method for cutting a laminate, comprising the steps of:
    guiding a laminate to a cutting station having a cutting blade, the laminate having a web-shaped sheet and a plurality of single sheets, each of the plurality of single sheets having edges, edges of adjacent single sheets being in either an edge to edge or overlapping configuration, the guiding of the laminate being at a feed rate;
    precisely detecting a rear edge of each of the plurality of single sheets, prior to lamination, with an edge sensor;
    calculating a plurality of cutting locations on the laminate based on the detected rear edge of each of the plurality of single sheets and the feed rate; and
    cutting and completely separating the laminate at each of the plurality of cutting locations with the cutting blade, wherein the laminate is cut by the cutting blade at cut locations that are within about one millimeter of the precisely detected rear edge of each of the respective single sheets.

2. The method of claim 1, wherein the edge sensor is configured to detect a center of the rear edge.

3. The method of claim 1, wherein the edge sensor is one of a laser radiator, a microwave radiator, and an infrared radiator.

4. The method of claim 1, wherein the edge sensor is an air nozzle configured to exert blowing pressure on the plurality of single sheets.

5. The method of claim 1, further comprising providing a light barrier; and
    detecting a front edge of each of the plurality of single sheets via the light barrier.

6. The method of claim 5, wherein the edge sensor is a laser radiator.

7. The method of claim 1, further comprising continuously detecting the rear edge of each of the plurality of single sheets via the edge sensor.

8. A device for cutting a laminate including a web-shaped plastic sheet and a plurality of single sheets each having a precise rear edge, comprising:
- a cutting station including a cutting blade;
- a guide configured to guide the laminate toward the cutting station;
- a sensor configured to detect a signal, prior to lamination, associated with the precise rear edge of each of the plurality of single sheets, whether the edges of adjacent single sheets are in an edge to edge or overlapped configuration;
- a computer configured to control a cutting action of the cutting blade based on the signal and a feed rate of the laminates,
- wherein the computer is configured to control the cutting action of the cutting blade such that the laminate is cut and completely separated at cut locations by the cutting blade that are within about one millimeter of the precise rear edge of each of the respective single sheets.

9. The device of claim 8, further comprising a pair of laminating rollers arranged upstream from the cutting station and downstream from the sensor.

10. The device of claim 8, wherein the sensor is configured to continuously detect the signal.

11. The device of claim 8, further comprising a sheet feeder configured to store the plurality of single sheets at a first end of the sheet feeder and guide the plurality of single sheets in a direction of a second end of the sheet feeder.

12. The device of claim 11, wherein the sheet feeder is configured to guide the plurality of single sheets in a substantially horizontal orientation.

13. The device of claim 11, wherein the sheet feeder is configured to guide the plurality of single sheets in an underlapped configuration.

14. The device of claim 8, further comprising a circulation variable speed drive configured to move an outer edge of the cutting blade at substantially the same rate as the laminate.

15. The device of claim 8, wherein the cutting blade is a thermal culling blade.

16. The device of claim 8, wherein the cutting blade is configured to effect a wet cutting of the web-shaped plastic sheet.

17. The device of claim 8, wherein the computer is configured to control a speed of rotation of the cutting blade.

18. The device of claim 8, wherein the computer is configured to control the culling blade such that an outer edge of the cutting blade moves at substantially the same rate as the laminate.

19. The device of claim 8, wherein the cutting blade is a laser cutting blade.

20. The device of claim 19, wherein the laser cutting blade includes a plurality of stationary laser cutting heads.

21. The device of claim 8, wherein the sensor is one of an infrared transmitter, a microwave transmitter, a laser beam transmitter, a infrared receiver, a microwave receiver, and a laser beam receiver.

22. The device of claim 8, wherein the sensor emits a sensor beam, and
wherein the sensor beam is tilted in a direction of transport of the laminate.

23. The device of claim 8, wherein the sensor is configured to detect the signal in a substantially vertical direction.

UNITED STATES PATENT AND TRADEMARK OFFICE
CERTIFICATE OF CORRECTION

| | | |
|---|---|---|
| PATENT NO. | : 7,128,793 B2 | Page 1 of 1 |
| APPLICATION NO. | : 10/276375 | |
| DATED | : October 31, 2006 | |
| INVENTOR(S) | : René Haldner et al. | |

It is certified that error appears in the above-identified patent and that said Letters Patent is hereby corrected as shown below:

On the title page, item (75), line 2, insert --; Ernst Sturzenegger, Gossau (CH)--.

In claim 15, column 12, line 8, "culling" should read --cutting--.

In claim 18, column 12, line 16, "culling" should read --cutting--.

Signed and Sealed this

Ninth Day of January, 2007

JON W. DUDAS
*Director of the United States Patent and Trademark Office*